US008635669B2

(12) United States Patent
Iftode et al.

(10) Patent No.: US 8,635,669 B2
(45) Date of Patent: *Jan. 21, 2014

(54) METHOD AND SYSTEM FOR EXECUTION MONITOR-BASED TRUSTED COMPUTING

(71) Applicant: AT&T Intellectual Property I, L.P., Atlanta, GA (US)

(72) Inventors: Liviu Iftode, Princeton, NJ (US); Gang Xu, Piscataway, NJ (US)

(73) Assignee: AT&T Properties, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,548

(22) Filed: Nov. 9, 2012

(65) Prior Publication Data

US 2013/0074156 A1 Mar. 21, 2013

Related U.S. Application Data

(63) Continuation of application No. 13/084,614, filed on Apr. 12, 2011, now Pat. No. 8,332,632, which is a continuation of application No. 11/400,876, filed on Apr. 10, 2006, now Pat. No. 7,930,733.

(51) Int. Cl.
*G06F 21/52* (2013.01)

(52) U.S. Cl.
USPC ........ 726/3; 726/4; 726/5; 713/156; 713/165; 713/166; 713/167; 713/168; 711/152

(58) Field of Classification Search
USPC .............. 726/3–5, 22–25; 713/156, 165–168; 711/152
See application file for complete search history.

(56) References Cited

U.S. PATENT DOCUMENTS

| | | | |
|---|---|---|---|
| 5,649,099 A | 7/1997 | Theimer et al. | |
| 6,263,442 B1 | 7/2001 | Mueller et al. | |
| 6,351,810 B2 | 2/2002 | Gupta | |
| 6,351,816 B1 | 2/2002 | Mueller et al. | |
| 7,194,634 B2* | 3/2007 | Ellison et al. | 713/190 |
| 7,594,111 B2* | 9/2009 | Kiriansky et al. | 713/166 |
| 7,594,634 B2* | 9/2009 | Garotte et al. | 248/429 |
| 8,042,179 B2* | 10/2011 | Shoji et al. | 726/22 |
| 2005/0149729 A1* | 7/2005 | Zimmer et al. | 713/168 |
| 2006/0123227 A1* | 6/2006 | Miller et al. | 713/156 |
| 2007/0011723 A1* | 1/2007 | Chao | 726/4 |
| 2008/0141024 A1* | 6/2008 | Ranganathan | 713/155 |
| 2008/0276086 A9* | 11/2008 | Proudler | 713/165 |

OTHER PUBLICATIONS

Shi, et al., "BIND: A Fine-grained Attestation Service for Secure Distributed Systems," Proceedings of IEEE Symposium on Security and Privacy (1995).

(Continued)

*Primary Examiner* — Kambiz Zand
*Assistant Examiner* — Tongoc Tran
(74) *Attorney, Agent, or Firm* — Hoffmann & Baron, LLP

(57) ABSTRACT

A system and method to ensure trustworthiness of a remote service provided by a service provider. The method includes monitoring runtime dependencies invoked during execution of a service transaction associated with the remote service, the service transaction being requested by a service requester. The method further includes determining whether a deviation exists between the runtime dependencies and a trusted list of dependencies associated with the remote service. The method also includes blocking execution of the service transaction based on determining that the deviation between the runtime dependencies and the trusted list of dependencies exists.

20 Claims, 3 Drawing Sheets

(56) References Cited

OTHER PUBLICATIONS

Garfinkel, et al., "Terra: A Virtual Machine-Based Platform for Trusted Computing," Proceedings of the 19th ACM SOSP '03, Bolton Landing, New York (Oct. 19-22, 2003).

Arbaugh, et al., "A Secure and Reliable Bootstrap Architecture," Proceedings of IEEE Symposium on Security and Privacy, pp. 65-71 (1997).

Sailer, et al., "Design and Implementation of a TCG-based Integrity Measurement Architecture," Proceedings of 13th USENIX Security Symposium (Jan. 16, 2004).

* cited by examiner

METHOD AND SYSTEM FOR EXECUTION MONITOR-BASED TRUSTED COMPUTING

CROSS-REFERENCE TO RELATED APPLICATIONS

This application is a continuation of U.S. patent application Ser. No. 13/084,614, filed Apr. 12, 2011, and issued on Dec. 11, 2012 as U.S. Pat. No. 8,332,632, which is a continuation of U.S. application Ser. No. 11/400,876 filed on Apr. 10, 2006 and issued on Apr. 19, 2011 as U.S. Pat. No. 7,930,733, the disclosures of which are incorporated by reference herein in their entireties.

BACKGROUND

1. Field

The present invention relates generally to trusted service computing and, more particularly, to a method and system for continuously ensuring the trustworthiness of code accessed and executed on a remote server and maintaining privacy of user-supplied data even after execution of the remote transaction.

2. Related Art

Despite the proliferation and availability of computer security software and services, users of the Internet continue to be concerned about the trustworthiness of remote services. Verifying the authenticity of a server that a user connects to (e.g., through server certificate authentication) is no longer sufficient to ensure that a user is interacting with the intended service software running on the server. The trustworthiness of the service may be easily compromised, for example, by root kits, Trojan horses and viruses affecting the service software. As a result, even once the authenticity of the server is verified by conventional means, the user still risks receiving a bogus response and/or compromising the confidentiality of personal, confidential data which they have supplied during the transaction.

Several software attestation based methods have been developed recently that seek to ensure code genuineness and integrity on untrusted hosts. However, these methods fall short of guaranteeing continuous trustworthiness of remote services during and after a service transaction involving a user's confidential data. Generally, most known methods that attempt to verify the service's trustworthiness in delivering a response are employed before the transaction occurs, i.e., pre-transaction. For example, the trustworthiness of the service at the time the remote code is loaded can be verified by computing a hash value of the loaded program which can later be used by a remote user to verify against the system's loaded code. This load-time attestation method, however, is difficult to implement, and still does not guarantee trustworthiness at the time of execution, or after the conclusion of the transaction.

Moreover, it is difficult to evaluate trust by verifying attestation results in accordance with the existing attestation based methods. For instance, in Sailer, et al., "Design and implementation of a TCG-based integrity measurement architecture," *Proceedings of* 13*th USENIX Security Symposium* (2004), all files on the service platform are attested. This approach is subject to false positives, in that even if a single bit is changed in a file irrelevant to the service, the established trust must be revoked. Others have attempted to mitigate this problem by attesting the entire virtual machine image at block level, as described in Garfinkel, et al., "Terra: A virtual machine-based platform for trusted computing," *Proceedings of the* 19*th ACM Symposium on Operating Systems Principles* (2003). However, the attestation results produced are difficult for the common user to understand and evaluate, rendering the method impractical to implement.

Finally, the conventional methods do not address the problem of preserving the confidentiality of a user's confidential data supplied to the remote service, both during and after the transaction. Accordingly, none of the known methods provide continuous trustworthiness of remote services across all phases of a service transaction (before, during, and after the transaction).

There is a need, therefore, for a method and system for providing trusted service transactions which attests to the continuous trustworthiness of remote services to a service requester and which protects the privacy of user-provided data.

SUMMARY

The present invention, which addresses the needs of the prior art, provides a method of providing trusted service transactions between a service provider hosting a remote service and a service requester requesting execution of at least one trusted service transaction associated with the remote service.

In particular, a method of the present invention for providing trusted service transactions includes associating a commitment with the remote service. The commitment includes a trusted list of runtime dependencies used by the service provider to execute the at least one trusted service transaction. The commitment associated with the remote service may include a certificate signed by a certificate authority.

The method further includes monitoring an actual list of runtime dependencies invoked during execution of the at least one trusted service transaction, and blocking further execution of the at least one trusted service transaction in response to detecting a deviation of the actual list from the trusted list. The blocking step may include rebooting the service provider in response to detecting the deviation or in response to detecting a corrupted operating system. Accordingly, completion of the at least one trusted service transaction is allowed only if no deviation is found between the trusted list and the actual list of runtime dependencies.

In one aspect of the method of the present invention, the service provider includes an operating system kernel that includes a trusted monitor to perform the monitoring and blocking steps. The method then further includes attesting the operating system kernel and trusted monitor upon loading the remote service using, for example, a trusted boot process in the service provider. The method may further include loading and attesting the commitment and saving the attestation result in the trusted operating system kernel memory before the monitoring step.

The method may also include receiving a request from the service requester to ensure the remote service can be trusted before initiating the at least one trusted service transaction, reporting the attestation result and delivering the commitment to the service requester in response to receiving the request.

The method may additionally include verifying in the service requester a trustworthiness of the remote service in response to the reporting and delivering step. The verifying step may include evaluating trustworthiness of the commitment delivered by the service provider. Execution of the at least one trusted service transaction is initiated after the verifying step at the request of the service requester.

The method may still further include switching the trusted monitor from an attesting mode before the monitoring step to a monitoring mode to implement the monitoring and blocking step in response to the service requester initiating execution of the at least one trusted service transaction.

Another method of the present invention for providing trusted service transactions between a service provider hosting a remote service and a service requester requesting execution of at least one trusted service transaction associated with the remote service includes associating a commitment with the remote service. The commitment includes a trusted list of runtime dependencies used by the service provider to execute the at least one trusted service transaction. The service provider includes an operating system kernel and a trusted monitor integrated into the operating system kernel. The method further includes attesting the operating system kernel and the trusted monitor upon loading the remote service, loading and attesting the commitment, and saving the attestation result in the trusted operating system kernel memory. Additional steps include receiving a request from the service requester to ensure the remote service can be trusted before initiating the at least one trusted service transaction, reporting the attestation result, and delivering the commitment to the service requester in response to the receiving. The method also includes verifying in the service requester a trustworthiness of the remote service and the commitment in response to the reporting and delivering, and initiating execution of the at least one trusted service transaction after the verifying step in response to the service requester requesting the initiating step.

Once the service transaction is initiated, the monitoring and blocking steps are performed by the trusted monitor. In the monitoring step, an actual list of runtime dependencies invoked during execution of the at least one trusted service transaction is monitored. In the blocking step, further execution of the at least one trusted service transaction is blocked in response to detecting a deviation of the actual list from the trusted list. Accordingly, completion of the at least one trusted service transaction is allowed only if no deviation is found between the trusted list and the actual list of runtime dependencies.

A system of the present invention for providing trusted service transactions between a service provider hosting a remote service and a service requester requesting execution of at least one trusted service transaction associated with the remote service includes: a commitment associated with the remote service, and a trusted monitor in the service provider. The commitment includes a trusted list of runtime dependencies used by the service provider to execute the at least one trusted service transaction associated with the remote service. The trusted monitor is adapted to monitor execution of the at least one trusted service transaction. The trusted monitor monitors an actual list of runtime dependencies invoked during execution of the at least one trusted service transaction, and blocks execution of the at least one trusted service transaction in response to detecting a deviation of the actual list from the trusted list. Accordingly, completion of the at least one service transaction is allowed only if no deviation between the trusted list and the actual list of runtime dependencies is detected.

The remote service may include, for example, a web-based service or a dynamic network service.

In one aspect, the service provider of the system includes an operating system kernel, and the trusted monitor is integrated into the operating system kernel. The system further includes a trusted boot module in the service provider for attesting the operating system kernel and the trusted monitor during a trusted boot process. The trusted boot module may be a Trusted Computing Group specified Trusted Platform Module.

In another aspect, the system may also include an evaluator associated with the service requestor that is adapted to verify the commitment before the service requester requests execution of the at least one service transaction. The system may further include a public key infrastructure associated with the service requester for verifying a trustworthiness of the remote service in cooperation with the evaluator.

In yet another aspect, the commitment may include a signed certificate provided by a certificate authority.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

The present invention provides a method and system for providing trusted service transactions between a service provider hosting a remote service and a service requester requesting at least one trusted service transaction associated with the remote service. The system and method provide continuous attestation of the trustworthiness of the service before, during, and after the transaction. Therefore, privacy of user-supplied data may also be ensured.

The user's operating platform is referred to herein as the service requester. The remote service platform is referred to herein as the service provider.

A "service transaction" is referred to herein as a procedure in which the service requester of a remote network service, sends a request to and receives a responsive report to the request from the service provider. The remote network service is also referred to herein as the "service" or "remote service," and includes the processes required to initiate and complete a service transaction.

One skilled in the art will appreciate that the network service, S, will include the service daemon process, and child processes spawned by the service daemon during execution. All processes associated with the service are collectively referred to as P(S). Usually, the daemon process binds to a socket as the interface to the requester.

Figure 1:
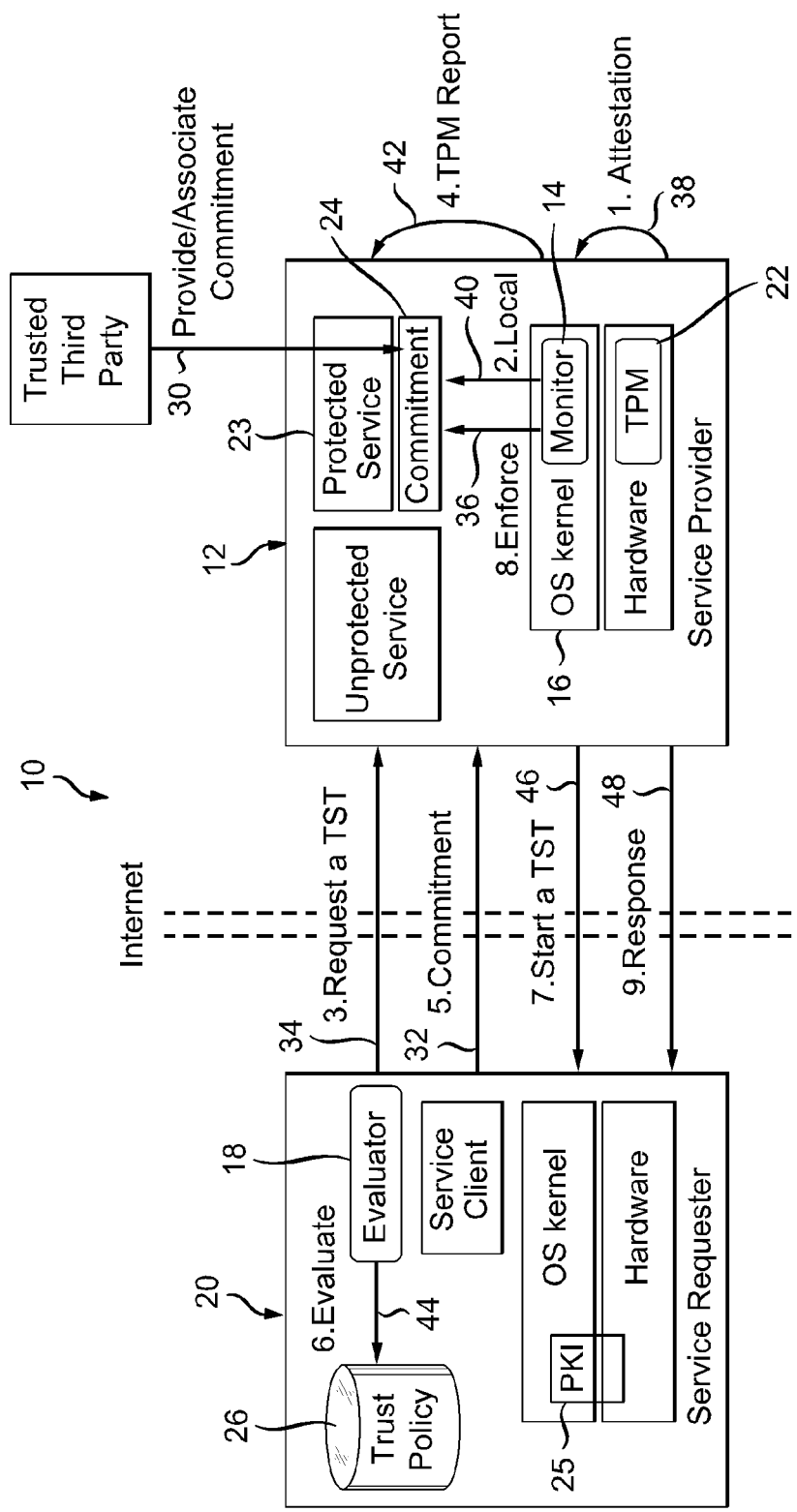
FIG. 1 is a block diagram of a system for implementing a method of the present invention.

Referring to FIG. 1, an embodiment of a system 10 for implementing a method of providing trusted service transactions to a user from a remote service provider 12 according to the present invention includes a trusted software execution monitor 14, which resides in the operating system (OS) kernel 16 of the service provider 12, and a trust evaluator 18, which preferably resides on a service requester 20.

The service provider 12 also preferably includes a hardware trusted boot module 22, such as a Trusted Computing Group (TCG) specified Trusted Platform Module (TPM), which is well-known to those skilled in the art. The trusted boot module 22 is implemented to form a trusted computing base as follows. The service provider 12 attests the OS kernel 16, which includes the monitor 14, through a trusted boot process performed by the trusted boot module 22. In particular, the service provider 12 exploits the trusted boot process to attest the entire boot chain, from the BIOS to the OS loader and finally to the OS kernel 16 in a tamper-resistant manner. As a result, the monitor 14, together with the OS kernel 16, is a so-called "trusted computing base" (TCB) and the monitor 14 is a "trusted monitor."

The OS kernel 16 of the present invention may be any suitable OS kernel known to those skilled in the art which can implement the method of the present invention. The kernel 16 is preferably statically linked and thus correctly implements process isolation and memory protection and management. The system 10 of the present invention only monitors code executed by the protected service 23. However, malicious codes may interfere with a process without modifying the actual code running the process. By implementing process isolation, the system 10 preferably prevents, or at least minimizes, the possibility that such malicious code can interfere with the protected service 23.

A "trusted monitor" is referred to herein as a monitor that has been attested, for example, through a trusted boot process. As such, the trusted software execution monitor 14 can exploit the service execution context to ensure continuous trustworthiness of a remote service 23 during the transaction, and to ensure the maintenance of privacy of user-supplied data in the post-transaction phase. Because the trustworthiness of the service 23 is maintained, the remote service 23 provided is a "protected service."

The trusted monitor includes executable code integrated into the OS kernel 16, according to methods well known to those skilled in the art, to implement the method of the present invention.

The service provider 12 also includes a so-called "commitment" 24 corresponding to each protected service 23. The commitment 24 is a nonexecutable protected file that describes all the code the protected service 23 may execute in all circumstances, and preferably in its entire lifetime, such as executables, libraries, and the like. The commitment 24 is preferably supplied to the service provider 12 by a trusted third-party, and delivered by the provider 12 to the trust evaluator 18 prior to actual initiation of the transaction.

The service requester 20 preferably also includes a public key infrastructure (PKI) 25, which one skilled in the art will recognize is a system of digital certificates, Certificate Authorities, and other registration authorities that verify and authenticate the validity of each party and of files passed between the parties in an Internet transaction. The PKI 25 may include both hardware and software.

The trust evaluator 18 residing on the service requester 20 verifies that the service described by the commitment 24 can be trusted, preferably by authenticating the TPM 22 according to methods known to those skilled in the art, including those which implement PKI 25. Though the commitment 24 demonstrates genuineness of the code the protected service 23 will run, it does not necessarily guarantee the code trustworthiness or correctness. Accordingly, the service requester 20 preferably also includes a local trust policy 26, which is known to those skilled in the art, for use in evaluating whether the code that is run on the provider 12 for servicing the transaction can be trusted.

The trusted boot module 22 of the present invention is, of course, preferably unbreakable, or at least optimized for tamperproof operation. Therefore, the attestation conducted by the boot module 22, e.g., TPM, and the reports generated are, at least to a high probability, untainted.

Referring still to FIG. 1, a method of the present invention for providing trusted service transactions between the service provider 12 hosting the remote service 23 and the service requester 20, includes associating 30 the commitment 24 with the remote service 23, which includes an initial list of expected runtime dependencies used for completing the requested transaction. The commitment 24 is preferably provided 30 by a trusted third party, such as a software vendor or other trusted authority.

A request or challenge to ensure a trusted service transaction is preferably received 34 by the provider 12 from the service requester 20. In response thereto, a promise is delivered 32 to the service requester 20 that the commitment 24 associated with the transaction will be enforced.

The method further includes monitoring 36 execution of the remote service 23 during the requested service transaction using the trusted monitor 14. The monitoring step 36 enforces the commitment 24 by monitoring an actual list of runtime dependencies invoked during an attempted execution of a service transaction, and blocking execution at any time if a deviation of the actual list from the trusted list is detected.

In particular, all the code executed by the service daemon process and its child processes are attested against the commitment 24. Whenever a discrepancy or deviation is detected, i.e., a code file to be executed is not defined in the commitment 24 or defined but attested to be different, the monitor 14 blocks the code from being executed. In the meantime, the monitor 14 forbids any modification to the kernel 16. Consequently, the requested service transaction is initiated and completed only if no discrepancy is found between the commitment 24 and the actual list of runtime dependencies invoked during an attempted execution of the service transaction.

Still referring to FIG. 1, the method preferably also includes providing the trusted monitor 14 in the service provider 12 by attesting 38 the OS kernel 16 and monitor 14, which resides in the kernel 16, through any known trusted boot process. The trusted boot process is implemented by the trusted boot module 22 as described above. The attestation result generated by the trusted boot module 22, therefore, verifies the trustworthiness of the monitor 14, as well as the entire kernel 16.

Preferably when the protected service is started, the trusted monitor 14 loads and attests 40 the commitment 24. The attestation result is saved in a memory associated with the trusted operating system (OS) kernel 16 and used in the monitoring step 36. In one embodiment, the service provider 12 collects the hash values of all the files associated with the service 23, i.e., in the commitment 24, and ensures their genuineness by having them certified by a third-party trusted certificate authority. When the challenge is received 34 from the service requester 20 to ensure the service transaction, the attestation results may then be reported 42 to the service requester, along with the commitment (step 32).

Finally, the service requester preferably verifies 44 the trustworthiness of the remote service 23 and commitment 24 received from the provider 12, prior to initiating 46 the transaction. This step 44 is preferably accomplished using TPM authentication methods known to those skilled in the art, in cooperation with the trust policy 26. For example, the requester 20 may hold the correct hash values of all the files attested by the trusted boot module 22 and the monitor 14 in order to judge the genuineness and integrity of those files in the commitment 24 through implementation of PKI 25.

The method preferably further includes initiating 46 the remote service transaction in response to the verifying step 44. A responsive report of the results of the requested service transaction may be generated 48 at the completion of the transaction and made available to the requester 20.

In order to ensure the authenticity of the responsive report, the method may also include verifying a TPM signature attached to the report, by implementing PKI 25 according to methods well-known to those skilled in the art.

The system of the present invention, referred to generally herein as a "service-aware trusted execution monitor" ("SATEM"), therefore guarantees continuous trustworthiness of the service to the service requester before a service transaction is started, by integrating this two-phase "commit-enforce" protocol into regular service transactions. In the first phase, referred to herein as the "commit phase," the monitor 14 is challenged in receiving step 34 by the requester 20 to ensure a secure transaction. The provider 12 responds by providing the attestation results of the OS kernel 16 with monitor 14 from step 42 and by delivering 32 the attested commitment 24.

The trustworthiness of the commitment 24 is guaranteed by the method 30 of providing, or retrieving, the commitment 24 from a trusted third-party. The trusted third-party may include, for example, the vendor of the service software and/or another trusted authority.

If the requester 20 verifies 44 against its local policy 26 that the kernel 16, monitor 14, and the commitment 24 are trusted, then the requester 20 initiates the transaction and enters the second phase, the "enforce" phase, which includes the monitoring step 36. From this point until the transaction is complete, the monitor 14 guarantees that the service execution will not deviate from its commitment 24. In particular, the monitor 14 ensures that no untrusted code files are loaded. In addition, once a piece of trusted code is loaded, the monitor 14 ensures that its runtime image will not be tampered with.

Accordingly, by verifying trust before initiating the transaction, a user of the service has taken two steps to ensure trusted service transaction before it starts: 1) confirmed the trustworthiness of the OS kernel as well as the monitor by verifying the TPM attestation result; and 2) confirmed the trustworthiness of the upcoming service transaction by verifying the commitment. The first step assures the user that the service has executed only trusted code up to the time the provider attests and delivers the commitment. In addition, because it is already known that the monitor is capable of enforcing the commitment, by verifying the commitment in the second step, the user can trust that the monitor will continue to do so during and after the transaction in the enforce phase. Thus, the system of the present invention provides a "service-aware" attestation method, in that the system is "aware" of what the requester trusts via the commitment, and attests to whether or not the service lives up to the trust at any time during the transaction.

In addition, the method preferably includes attesting only that code executed by the service. All other irrelevant files in the service provider system are ignored, so that both attestation overhead and false positives are minimized.

Referring again to the system 10 for implementing the method of the present invention, a preferred embodiment includes a TCG specified TPM as the trusted boot module 22, as well as a monitor 14 and a commitment 24 in the provider 12 for each protected service. In this preferred embodiment, the TPM 22 helps establish trust on the OS kernel 16 and the monitor 14, which is the root of trust in all service transactions.

One skilled in the art will recognize that a number of functions are available in a TCG specified TPM for supporting secure key storage, attestation and sealed data storage and so on. A number of these attestation functions are preferably implemented by the system of the present invention as discussed herein. For exemplary purposes, current TPM specifications using SHA1 are assumed. However, one skilled in the art will appreciate that future upgraded releases of TPM with stronger one-way hash function, such as SHA256, may be preferably implemented to increase the likelihood of tamper-proof attestation. Furthermore, it is understood that the scope of the present invention is by no means limited to the TPM described herein.

One skilled in the art will recognize that the TPM contains several platform configuration registers (PCRs) for attestation. The only way to change the content of a PCR is through function TPM_Extend, which computes a SHA1 hash over the PCR's current content and the new object to attest. For example, if an object O needs to be attested in the ith PCR, the following function is called: TPM_Extend(o,i)=SHA1 ($PCR_i$|o), where $PCR_i$ is the current value of the ith PCR and "|" indicates concatenation. This prevents the PCR content from being reset, so that a potential attacker can change the attestation value, but cannot set it to an arbitrary predetermined one. The contents of selected PCRs are reported via TPM_Quote API, which signs the contents with a TPM internal key. To counter replay attack, this API also includes a 20 byte random nonce as a parameter in the signed report.

The monitor 14, which resides in the OS kernel 16 of the service provider 12, is a central component of the SATEM system. The monitor 14 may be described as working in two modes: an attestation mode and a monitoring mode. The monitor 14 enters the attestation mode immediately after the OS kernel 16 is loaded during the trusted boot process. This mode is non-intrusive in that it only attests all dynamically loaded kernel modules by use of the TPM functions. Hence, it guarantees a genuine kernel. In this mode, the monitor 14 ignores any code execution including network services.

The monitor 14 preferably switches to the monitoring mode upon receipt of the user's challenge 34 to conduct a trusted service transaction. In the monitoring mode, the monitor 14 begins to monitor service executions. Upon loading the protected service 23, the monitor 14 loads 40 its commitment 24. When the requester sends his challenge to enforce a trusted service transaction with the protected service 23 on the service provider platform, the monitor 14 delivers 32 the commitment 24 and all attestation results 42 since system power-on in response.

In addition, from the time the protected service 23 is loaded to run, the monitor 14 enforces the commitment 24 by making sure that all code executed by the service 23 is defined in the commitment 24 and remains untainted. The monitor 14 is also configured to disable module insertion. This is crucial to guarantee the integrity of the kernel and the monitor itself, which protects the already loaded code from being tampered with by other untrusted processes. In this sense, the monitoring mode is intrusive, and enables the system 10 to accomplish fail-stop protection to the protected service 23 and guarantee trusted service transaction to the requester 20.

In order to force the protected service 23 to run malicious code, an attacker may load a different kernel. The requester 20 can easily detect this by verifying the attestation results. The monitor 14 preferably must be manually switched into monitoring mode by the user before any protected service 23 gets executed. The switching is performed, for example, by executing an appropriate command. The attacker may choose not to SWITCH MODES. To counter this attack, therefore, the monitor 14 preferably also attests its current mode to the requester 20. Once in the monitoring mode, the monitor 14 can be switched back to the attestation mode or disabled. However, this will preferably cause the system 12 to reboot immediately. This guarantees that all established trusted transactions are terminated and leftover data in the memory of the provider system 12 are wiped out before the system 12 becomes untrusted.

Figure 2:
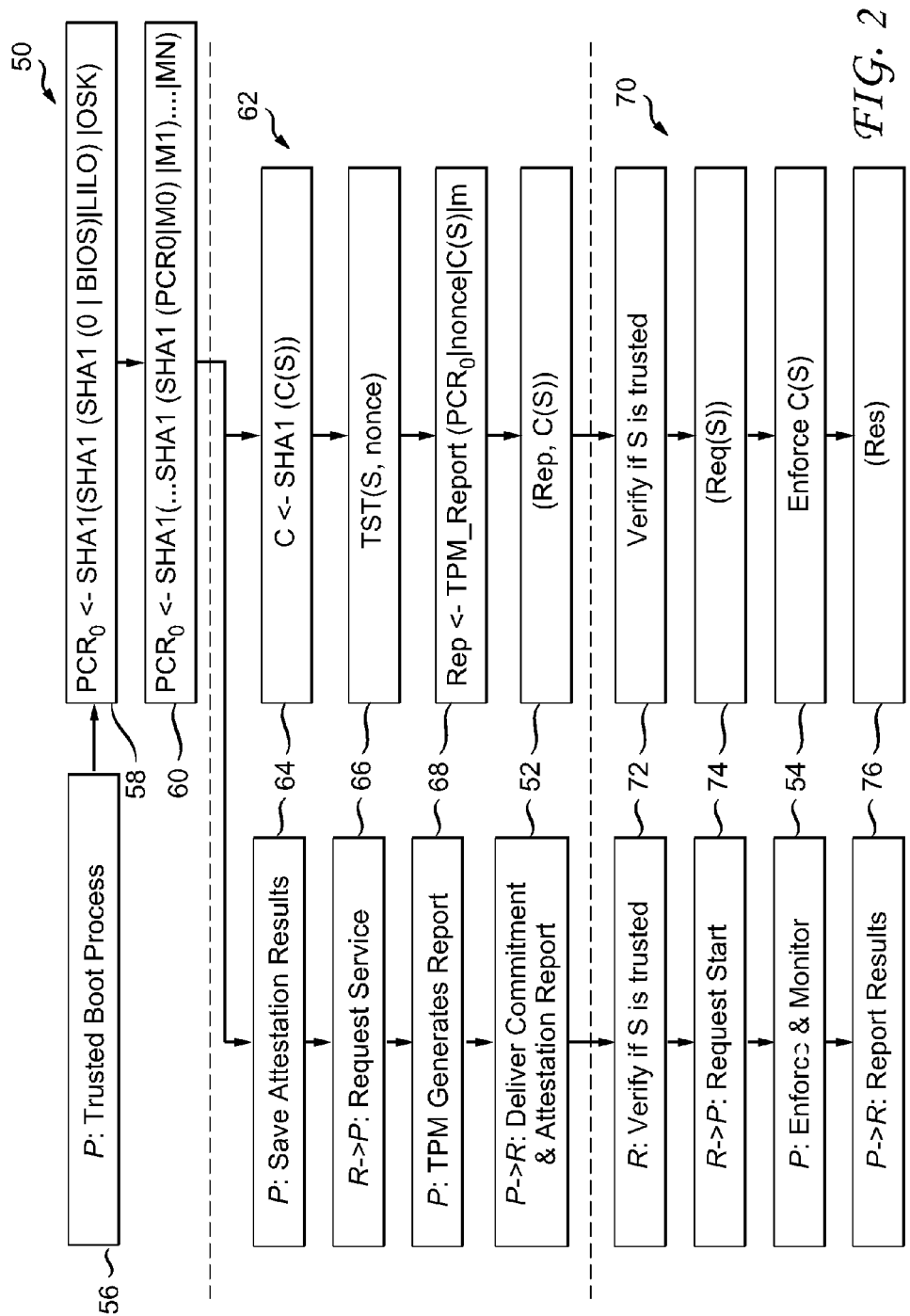
FIG. 2 is a flowchart of an embodiment of a method of the present invention.

An embodiment of the method of the present invention is described in additional detail in FIG. 2. The method is described assuming a TPM using SHA1 is implemented as described above, with its associated functions. However, it is understood that the scope of the method is not limited thereto, and that variations of the method to accommodate the particular TPM specifications and available functions are within the scope of the present invention. The requester, R, establishes a trusted transaction with the service, S, on the service provider, P, through the commit-enforce protocol as shown. The method includes establishing 50 the trusted computing base, delivering a commitment 52 and enforcing 54 the commitment.

Establishing 50 the trusted computing base includes initially running 56 through a trusted boot procedure, in which each component in the boot sequence attests the next one before handing over the control. The attestation result is typically saved 58 in a PCR register, denoted as $PCR_0$. The TPM calls TPM_Extend to compute SHA1 hash value of the BIOS image and subsequently transfers control to the BIOS. The BIOS then calls TPM_Extend over the OS loader (LILO) and the latter does the same over the OS kernel image, denoted as OSK. As a result, after the OS kernel is loaded, $PCR_0$=SHA1 (SHA1(SHA1(0|BIOS)|LILO)|OSK), assuming $PCR_0$=0 initially.

The monitor is loaded and attested in the trusted boot process 50 along with OSK. The monitor starts to run in an attestation mode immediately after the OS is loaded to attest all dynamically loaded OS kernel modules, denoted as $M_1$, $M_2$, ... $M_N$. Accordingly, the monitor updates 60 $PCR_0$ every time a new module is inserted as follows: $PCR_0$=SHA1( ... SHA1(SHA1($PCR_0|M_1$)|$M_2$) ... |$M_N$). Therefore, the attestation results captured in $PCR_0$ are sufficient to prove the trustworthiness of the OS kernel including its loaded modules. In particular, the results show that a genuine SATEM monitor exists on the service provider to conduct SATEM protocol.

In order to establish a trusted transaction with the service, S, P must deliver the commitment to R at step 52, preferably at the conclusion of the commit phase 62. When S is started up on P in the beginning, the monitor loads and attests its corresponding commitment C(S) in step 60. The attestation result SHA1(C(S)) is preferably saved 64 in kernel memory controlled by the monitor. When R wants to verify if a trusted transaction can be set up with S, it sends 66 a request, TST, for a trusted service transaction to P. The request includes a service identity, which in a TCP/IP network is the IP address plus port number and a random nonce.

Upon receiving TST, P calls the TPM to generate 68 a report Rep of the content of $PCR_0$. As a parameter, instead of passing just the nonce, the TPM preferably computes p=SHA1(nonce|C(S)|m), where m is the current mode, i.e., attestation (m=0) or monitoring mode (m=1), of the monitor itself. Therefore, Rep not only proves trustworthiness of the kernel and the monitor but also tells the requester what commitment the monitor enforces.

Finally, P delivers 52 the report Rep as well as the commitment C(S) to the requester for evaluation.

In the enforce phase 70, R preferably verifies 72 S against the local trust policy before starting 74 a trusted service transaction. R first verifies the authenticity and the integrity of Rep by verifying the TPM signature. In addition, the requester sets m=1 (monitoring mode) and computes p' using C(S) received at step 52 and nonce. Rep is verified if and only if p=p'. Next, R preferably verifies if all the code defined in C(S) is trusted by its local policy. When all these have been verified, R sends 74 S the request Req(S) to start the transaction. The monitor enforces C(S) 54 the commitment, and guarantees that S will only execute trusted code to process the results, Res.

Finally, S may generate and send back 76 a corresponding response with the results of the trusted service transaction.

Though the method is described herein in terms of a commit and enforce phase, it should be noted that enforcement of the commitment in reality begins at step 60, when the monitor loads and attests the commitment as well as the service. This ensures that the service can only execute trusted code before, during, and after the service transaction. The attestation results and the commitment delivered at step 52 assure the requester that the service had been protected by a genuine monitor and never deviated from the commitment up to that point. The requester verifies the commitment and attestation results and trusts the service at step 72. Since disabling the monitor renders all established trust transactions to be terminated, when the service receives the request at step 74, the requester is guaranteed that the service has never executed untrusted code before that. This is also true for any point of time after step 72, both during and after the transaction.

A commitment C(S) for service S of the present invention is a union of all the code S may execute. Once generated, it stays constant until the service has been updated, e.g., to a new version. Preferably, the service provider prepares the commitment(s) corresponding to its protected service(s). The code files and their hash values may be obtained from the software vendors, or optionally, via testing. In other words, the service may be traced for every possible request to find out what code it executes using utilities such as strace available in Linux or comparable utilities available in other operating systems. This method may be incomplete, however, since it is difficult to ensure that the test exhausts all branches of executions.

The commitment preferably begins with the identifier of the software followed by the integrity descriptions of all the code files belonging to the software. For example, a web service consisting of an Apache web server and a perl-based CGI script for user login will contain around 50 code file integrity descriptions. The identifier may be anything that can uniquely identify the software, such as its name and version. The integrity description of a code file is a two-tuple of <file name, SHA1 hash value>.

Once the commitment is prepared, the service requester may verify the correctness of the code. Instead of requiring the requester to acquire the correct hashes of a broad variety of code files, however, the system and method of the present invention preferably implements a third-party trusted authority to certify the correctness of the commitment.

A preferred method of providing and verifying the commitment is to trust the service software code producers to provide the information required to form the commitment with their own code. Referring to FIG. 2, C(S) is preferably a certificate signed by a certificate authority (CA) trusted by service requesters of S.

In another embodiment of the method of the present invention, the service S may require n different software packages, $S_1, S_2, \ldots S_n$ produced by n different vendors, $V_1, V_2, \ldots V_n$. For exemplary purposes, if the service is a web service which includes Apache, Perl, and a CGI package for authentication, then the C(S) is preferably created as follows.

The service provider requests each vendor $V_i$ to generate a self-signed code certificate for $S_i$, which is in the same form as the service commitment. In other words, it includes the identifier of $S_i$ and integrity description of each code file belonging to $S_i$.

The service provider collects all code certificates from the n vendors, extracts code identifiers and integrity descriptions from each certificate and puts them into a certificate request. Then it sends the request to the CA along with all the n code certificates.

The CA verifies the signatures of all code certificates, and then compares each code file in the certificate request with its vendor code certificate. If every file in the certificate request has both the same identifier and integrity description as in its vendor certificate, the CA signs the certificate request and the resultant certificate is C(S).

To sign C(S), the CA does not have to trust any of the code vendors to include correct description of its code files in its code certificate. Hence, the commitment C(S) only guarantees to the requester that the genuineness of the code $S_1$, $S_2$, ... $S_n$ described in C(S) is vouched for by their vendors. Therefore, the method of the present invention preferably includes the requester verifying and thus trusting the code.

Accordingly, the requester preferably verifies against its local policy that each vendor, as well as the code it produces, $S_i$, are trusted. Though a malicious service provider can lie about the service and obtain a C(S) which includes extra code, $S_{(n+1)}$, if the local trust policy is defined correctly, the problem can be caught when C(S) is verified. In addition, since $S_{(n+1)}$ is not needed by legitimate S at all, including it in C(S) does not cause it to be executed by the service unless some of the code in $S_1$, $S_2$, ... $S_n$ is compromised and no longer runs as expected.

To the service requester, decoupling code trustworthiness from genuineness not only simplifies trust management but makes it flexible. The requester can authenticate software through a single certificate verification without having to maintain a huge database of hash values of all code files. Furthermore, it still has the flexibility of adopting any trust policy.

When C(S) is verified by the requester, it is only partially attested and enforced by the monitor. Therefore, from the requester's perspective, C(S) may not necessarily be what are really to be executed. An attacker may be able to exploit this to generate a trusted C(S) but run a different malicious code. However, the attack will be detected and defeated when the monitor enforces the commitment.

The CA plays a central role in trust establishment. However, due to decoupling code genuineness from code trustworthiness, its job is also simplified compared to that of the conventional CAs which issue identity certificates for websites or email clients. The CA only has to verify authenticity of software code certificates in accordance with this preferred embodiment of the method of the present invention.

Consequently, since identity certificates are unnecessary, manual and time consuming background investigations are not required. Moreover, the need for certificate revocation is minimal because what the certificate vouches for is a fact that the vendor certifies that the code has some unique digest.

Figure 3:
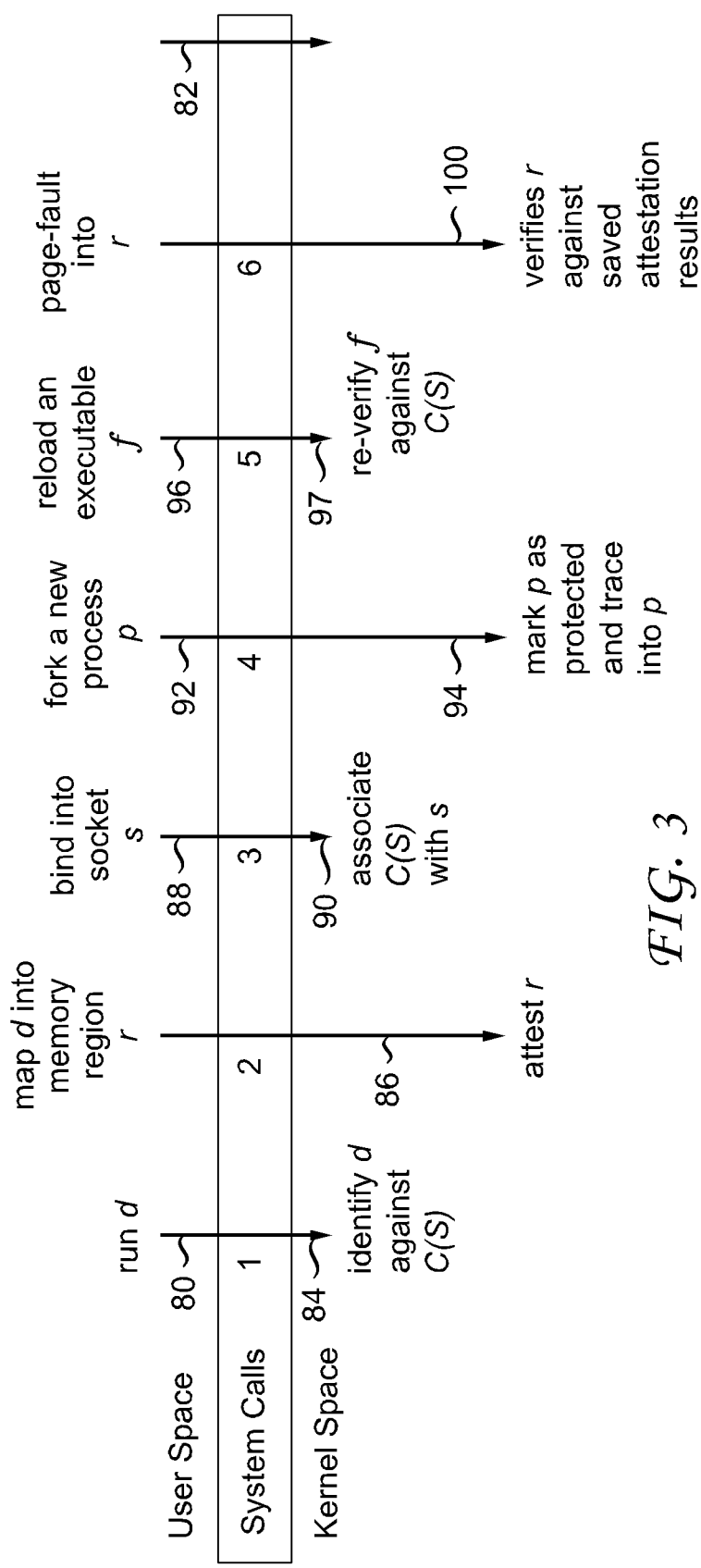
FIG. 3 is a representative timeline of some of the functions of a monitor implemented to perform a method of the present invention.

FIG. 3 describes the operation of an embodiment of a monitor formed in accordance with the present invention, from the time the service is launched 80 until it is executed 82. The up-down arrows represent interception of kernel calls, in which the monitor has the checkpoints.

In the embodiment shown, a Linux operating system (OS) kernel and associated Linux commands are implemented, and the service is based on TCP/IP. As described above, the monitor loads the commitment when the associated protected service is executed. To ensure that the service execution conforms to the commitment, the monitor blocks any attempt of the service to execute code which is either not defined in the commitment or defined but tampered. The monitor achieves this by tracking every service process and inserting checkpoints to kernel calls such as do_execve and sys_open to intercept new code execution invoked by the process.

When a service S is started 80, its daemon program d is executed, which calls do_execve( ) to trap into kernel. The monitor intercepts the call in the kernel and compares 84 d with a preset list of protected services, PS, to see if d $\in$ PS. Service providers which want to use SATEM, therefore, must provide such a list. Therefore, it defines the mapping between d and C(S). For instance, the following PS defines two protected services, namely, a web service associated with a commitment cw and a name service associated with a commitment cn: </usr/apache/bin/httpd cw> </usr/bind/named cn>

If d $\in$ PS, the monitor marks the current process as protected. Then it reads the commitment, C(S), attests d, and verifies whether d is defined in C(S) and has the same SHA1 value as in C(S). Then the interpreter, i, is loaded, e.g., ld.so for binaries and perl for perl scripts. The monitor recognizes that it is loaded by a protected service and thereby attests it the same as d.

Next, the kernel performs memory mapping 86 for d and i using do_mmap. Since the mapping is called by a protected service, the monitor marks the memory region r as protected and partitions the entire memory region into a list of small segments, such that r=<$sg_0$, $sg_1$, $sg_2$, ... $sg_{n-1}$>. Each $sg_i$ corresponds to a page. The monitor then reads each page to fill the segment $sg_i$ one after another and computes SHA1($sg_i$). The attestation results are saved in kernel internal memory. After attesting each $sg_i$, the kernel does not attempt to keep the content of the page in the memory.

The genuineness of PS is not assumed. Accordingly, the monitor does not verify whether PS tells the truth about what commitment is associated with the service. An attacker may attempt to associate bogus commitment with the service in order to run untrusted code. However, if the commitment is trusted but d or other code it will execute later is not, this will be detected immediately when the untrusted code is executed. Otherwise, if the commitment is not trusted, the untrusted code can be executed without being blocked. But the requester will refuse to trust the service when verifying the commitment.

When d is fully loaded, the kernel transfers control to its interpreter to have shared libraries loaded. Similar to d, a library l is mapped not read into memory and attested the same as d.

Next, the service program binds 88 a network socket. The sys_bind system call traps into the kernel. The monitor then first checks whether the current process is protected. If so, it links 90 C(S) with the socket such that when being challenged by the requester the monitor delivers the right commitment. This defeats any prior-transaction attack.

The current process may create 92 new child processes. In this case, the monitor intercepts the fork system call and checks if the current process is protected. If so, it marks 94 the new child process as protected and links C(S) to the new child process. Then monitor extends to track the new child process as well as the existing parent process in the same way.

The service may be compromised at any time when any of its code file is tampered with. The monitor preferably does not, however, attempt to catch the change when it happens. Instead, it detects and blocks any attempt of a protected process to invoke the compromised code. A direct way for an attacker to change a code file is to modify it on disk and reload it 96. As discussed earlier, the monitor will block the reload attempt in do_execve call, and will re-verify the files against C(S) 97. The monitor does not differentiate legitimate software upgrading or patching from illegal compromise. Therefore, to upgrade or patch code used by a protected service, the monitor has to be first disabled, which causes the system to reboot.

An alternative way to change the code file is to change the disk image of a binary code directly without going through the file system. Consequently, since the code is mapped into memory, changes on disk may not be reflected in memory. Later, when kernel encounters a page fault, it will load the tampered page by calling filemap_nopage. Attestation at the granularity of files cannot detect this problem. Actually, mapping can exist without keeping the underlying file open, which makes it impossible to catch changes just by watching calls like sys_open( ) sys_read( ) and sys_write( ). SATEM can defeat such attacks with the help of the previously saved hash values for the protected memory regions. Whenever a memory fault causes a real read of a missing page, the monitor recomputes the SHA1 value of the page to be read and compares 100 it with the saved value. If it is different, the monitor then knows that the page is tampered with on the disk after being mapped.

In addition, the kernel may also be changed by an attacker by rebooting into a different one. In this case, the change is preferably captured by the TPM in trusted boot and revealed to the requester when the commitment is verified.

Another way for an attacker to change a running OS is to insert or remove kernel modules. Any kernel change compromises integrity of the trusted computing base and must be considered to be impacting to all protected services. This is because they may potentially tamper with the monitor and its internal memory which contains commitments and other critical data. As a result, SATEM preferably forbids module insertion and removal whenever the monitor is in monitoring mode.

Interpretation or virtual machine based executables, e.g., perl scripts or Java servlets, are a little more difficult to monitor, because their execution is a black box to the monitor. All files opened and read by protected processes would have to be monitored. However, there is no way for the monitor to tell the executables from regular data files which is impertinent to the service execution. In an embodiment of a method of the present invention to address this issue, the commitment C(S) includes all such code files that the service will read to execute in an interpreter or a virtual machine. The vendors of the code therefore preferably provide the certified lists of these code files. Accordingly, when the monitor encounters a file in sys_read call, it verifies the file against the commitment.

Attestation of large code files and mapped memory regions is costly. SATEM optimizes the performance by avoiding unnecessary attestations. For a binary code file, when it is executed, the kernel only loads part of its content such as the ELF header. SATEM partitions the file into a series of page sized chunks and attests those chunks containing the loaded content. The results are cached. When the file is executed next time, if the commitment has not been changed, the SATEM does not attest the file. Instead, SATEM verifies each of its loaded chunks against the cached attestation results. If the execution loads a new chunk which has not been loaded before, SATEM attests the file. This will not compromise the established trustworthiness because as long as the commitment is not changed the cached attestation results represent the trusted view of the code.

The monitor saves attestation results of protected memory regions and commitments in system memory rather than in the tamper-resistant TPM. This is partly because TPM does not have sufficient space for the variable-sized results. Hence, the memory area is preferably well-protected such that only the monitor is allowed to write to this area. The OS kernel is preferably configured to correctly handle memory management. Consequently, the only way to potentially tamper with this area from user space is through the direct memory mapping mechanism via /dev/kmem and /dev/mem. To address this problem, the monitor preferably defines the area and forbids access to it from any non-SATEM user space applications.

Experiment

In order to verify the design concept and understand the performance of SATEM, a prototype under Linux 2.6.12 kernel and a Trusted Platform Module (TPM) by National Semiconductor integrated into IBM ThinkCenter S51 were implemented.

The prototype was composed of three parts: TPM control functions, a SATEM monitor (14) and evaluator (18). The attestation functions in BIOS and LILO, were not implemented.

TPM Functions

The implementation was based on an IBM TPM driver. SATEM only needs to use TPM for attestation and result reporting, i.e., the TPM_Extend and TPM_Quote functions.

SATEM Monitor

SATEM monitor (14) is preferably small, though it is integrated into the OS kernel almost everywhere. In the prototype, the SATEM monitor contained less than 1000 lines of C code, and was implemented by patching an official Linux kernel. One of the key implementations was to associate a protection flag to the protected process, memory region and file.

The flag is set when a service needs protection. By having this flag, the scope of SATEM may be limited within the protected service, so that attestation and other SATEM actions are not performed on irrelevant programs.

The commitment of a protected service is loaded into kernel memory when the service is started, and is preferably implemented as a table of hash values. SATEM preferably uses the file name as the key to look up the corresponding hash value. The monitor preferably maintains the list of SHA1 hashes for the mapped binaries of each protected service at page level. The Linux kernel crypto API was used to implement SHA1 functions in the prototype. The readahead mechanism in API reads pages not being currently accessed into memory with an anticipation that they will be accessed shortly. Therefore, for this particular implementation, SATEM computed SHA1 hashes not only over the accessed but missed pages but also over all these readahead pages.

SATEM Trust Evaluator

The SATEM trust evaluator (18) is a simple user space application, which performs RSA signature verification and hash comparison, methods well-known to those skilled in the art. The commitment certificate was not implemented by the prototype. However, implementation is trivial if the certificate authority is known to the evaluator.

For prototyping purposes, a simple TCP service was implemented on the service provider to deliver the commitment to the requester. When receiving a query for service S, it fetches the C(S) from the kernel and calls the TPM to generate the attestation report. The current implementation provides a special device file /dev/SATEM for it to read C(S). Read-only permission is granted to the service by the device driver.

SATEM monitor treats this TCP service as protected and always attests it. Accordingly, the requester must also verify its trustworthiness before verifying S.

Description of Experiments

SATEM achieves service-awareness by tapping into kernel functions. To understand the impact on system performance, the overhead of SATEM was measured in monitoring scope, commitment delivery, service execution and kernel calls.

CPU cost was measured using a Pentium 4 CPU hardware performance counter to count GLOBAL_POWER_EVENTS events. The counter overflow was set to 10000, i.e., 1 event in measurement equals 10000 GLOBAL_POWER_EVENTS events.

To evaluate SATEM enabled kernel calls, the timestamp counter (TSC) was directly read.

An IBM ThinkCenter S51 desktop with a Pentium 4 3.2 G Hz processor was used, along with a National Semiconductor TPM and 1 G RAM as the service provider. An IBM Thinkpad R40 laptop with Intel M 1.4 G Hz processor with 256 M RAM was used as the service requester. The services tested were a web service and a dynamic network services (DNS) service. The former was a simple conference registration center running Apache 2.0.50 and a perl based registration program. The latter was a 8.4.6 BIND server.

Scope of Monitoring

SATEM does not monitor all files on the service provider due to its service-awareness. The size of the monitoring scope was measured in terms of the number of files.

For the web service, only 42 files were monitored in runtime: in the kernel (10 files), httpd and its libraries (22 files), in the application-registration CGI script (1 file), and in its interpreter perl and required perl modules (9 files). In comparison, IBM TCG Linux attested more than 250 files. Thus, the scope of SATEM attestation was demonstrated to be smaller due to its service-awareness. The number files monitored by SATEM in the DNS model was even less at 13 total files.

Cost of Commitment Delivery

The provider's cost of commitment delivery was measured in the latency of getting the commitment ready for delivery. For the web service, the commitment latency was 782 ms, and for DNS, 765 ms. The cost does not show clear correlation with service type, because the TPM_Quote call dominates the latency. This demonstrates the efficiency of SATEM compared to other attestation-based methods because SATEM only calls the TPM once in delivering the commitment if no OS changes occur afterwards.

Cost of Service Execution

The CPU cost in initial service loading was measured in number of the GLOBAL_POWER_EVENTS events. SATEM incurred significant overhead in initial loading of both the web and DNS services to kernel and to the services as a whole, because SATEM attests each code file being loaded and each mapped memory region of the service. Since this is one-time initialization cost, it does not affect service transaction handling.

Overhead in service transaction handling is more serious because it may cause latency to the service response time. To measure the overhead in service transaction handling, a simple profiler program was run from the service requester. In a web service transaction, the profiler registers a user with the conference and downloads the conference agenda. In a name service transaction, the profiler conducts a number of DNS queries. The profiler keeps initiating transactions and reads data from "oprofile" every 50 transactions. It was shown that SATEM did not incur significant overhead to the protected services due to the delayed attestation mechanism.

Overhead in Kernel Calls

The overhead cost of various kernel calls in the web service transactions were measured in terms of extra CPU cycles needed to complete these calls: do_execve, do_mmap, sys_open and filemap_nopage.

For do_execve and do_mmap, the cost for SATEM was dramatically increased because of the per-page attestation for mapped code files. For filemap_nopage, by contrast, the cost was significantly reduced in comparison to SATEM-unprotected and original kernels. This is because SATEM needs to load every mapped page into the page cache when it attests a protected memory region. As a result, when a page fault occurs, very likely the page is still in the cache. Moreover, the cost of the subsequent calls in the SATEM protected kernel is almost the same as in the original kernel. This is also because of the delayed attestation. Finally, when the function in SATEM kernel was called from an unprotected service, its performance was comparable to that in original kernel. This indicates that SATEM does not impact other unprotected programs.

In addition to the application of trusted web services described above, the system and method described herein may also be applied to, but are not limited to, client side access control and play-only mp3 songs, for example.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of ensuring trustworthiness of a service transaction associated with a remote service provided by a service provider, the method comprising:
  accessing, using a processor, a trusted list of runtime dependencies associated with the remote service in response to a request by a service requester for the service transaction;
  monitoring, using the processor, runtime dependencies invoked during execution of the service transaction;
  determining, using the processor, whether a deviation exists between the runtime dependencies and the trusted list of runtime dependencies; and
  blocking execution of the service transaction, using the processor, based on determining that the deviation between the runtime dependencies and the trusted list of dependencies exists.

2. The method of claim 1, further comprising attesting trustworthiness of an operating system kernel and a monitor associated with the operating system kernel in a trusted boot process in response to loading the remote service by the service provider, the monitor using the processor to perform the monitoring, determining and blocking.

3. The method of claim 2, further comprising:
  attesting trustworthiness of the trusted list of dependencies associated with the remote service; and
  storing an attestation result in a platform configuration register of the operating system kernel, wherein monitoring further comprises monitoring the runtime dependencies invoked during execution of the service transaction using the attestation result.

4. The method of claim 3, further comprising authenticating the service transaction using a third party certificate verification.

5. The method of claim 3, the method further comprising:
  receiving a request from the service requester to ensure that the remote service can be trusted before initiating the service transaction; and transmitting the trusted list of dependencies and the attestation result to the service requester in response to receiving the request.

6. The method of claim 5, further comprising authenticating the remote service at the service requester.

7. The method of claim 5, further comprising verifying at the service requester trustworthiness of the remote service, the verifying comprising evaluating trustworthiness of the trusted list of dependencies received from the service provider based on the trusted list of dependencies and the attestation result.

8. The method of claim 7, further comprising initiating execution of the service transaction at the service provider in response to the service requester requesting the service transaction, the request for the service transaction being made after the service requester verifies the trustworthiness of the remote service.

9. The method of claim 8, further comprising switching to a monitoring mode from an attestation mode to implement the monitoring, determining and blocking in response to initiating execution of the service transaction.

10. The method of claim 9, further comprising rebooting the service provider in response to the monitoring mode switching to the attestation mode.

11. The method of claim 1, wherein blocking further comprises rebooting the service provider in response to determining that the deviation exists.

12. A system to ensure trustworthiness of a service transaction associated with a remote service, the system comprising:
a service provider that executes a service transaction associated with the remote service, the service transaction being requested by a service requester, the service provider including a processor, a memory device, and a monitor executed by the processor to access a trusted list of runtime dependencies associated with the remote service, the monitor monitoring runtime dependencies invoked during execution of the service transaction, the monitor determining whether a deviation exists between the runtime dependencies and the trusted list of runtime dependencies, the monitor blocking execution of the service transaction based on determining that the deviation between the runtime dependencies and the trusted list of runtime dependencies exists.

13. The system of claim 12, further comprising a trusted boot module that attests trustworthiness of an operating system kernel and the monitor, the monitor being associated with the operating system kernel, in response to loading the remote service by the service provider.

14. The system of claim 13, wherein the monitor attests trustworthiness of the trusted list of dependencies associated with the remote service, the monitor storing an attestation result in a platform configuration register of the operating system kernel.

15. The system of claim 14, wherein the monitor monitors runtime dependencies invoked during execution of the service transaction using the attestation result.

16. The system of claim 15, wherein the service provider receives a request from the service requester to ensure that the remote service can be trusted before initiating the service transaction, the monitor transmitting the trusted list of dependencies and the attestation result to the service requester.

17. The system of claim 16, wherein the service requester comprises an evaluator module that verifies trustworthiness of the remote service based on the trusted list of dependencies and the attestation result.

18. The system of claim 12, wherein the monitor switches to a monitoring mode from an attestation mode, the monitor rebooting the service provider in response to the monitoring mode switching to the attestation mode.

19. The system of claim 12, wherein the monitor reboots the service provider in response to determining that the deviation exists.

20. The system of claim 17, wherein the service requestor further comprises a public key infrastructure to authenticate the trusted list of dependencies, the trusted list of dependencies being associated with a certificate signed by a certificate authority.

* * * * *

UNITED STATES PATENT AND TRADEMARK OFFICE
CERTIFICATE OF CORRECTION

| | | |
|---|---|---|
| PATENT NO. | : 8,635,669 B2 | Page 1 of 1 |
| APPLICATION NO. | : 13/673548 | |
| DATED | : January 21, 2014 | |
| INVENTOR(S) | : Iftode et al. | |

It is certified that error appears in the above-identified patent and that said Letters Patent is hereby corrected as shown below:

IN THE PATENT:

On the Title Page item (71):

| ERRONEOUS INFORMATION: | CORRECT INFORMATION: |
|---|---|
| Applicant: | Applicant: |
| AT&T Intellectual Property I, L.P., Atlanta, GA (US) | AT&T Intellectual Property II, L.P., Atlanta, GA (US) |
| | Rutgers, The State University of New Jersey, New Brunswick, NJ (US) |

Signed and Sealed this
Twenty-seventh Day of May, 2014

Michelle K. Lee
*Deputy Director of the United States Patent and Trademark Office*